Patented Jan. 20, 1953

2,626,274

UNITED STATES PATENT OFFICE 2,626,274

HYDROCARBON SYNTHESIS

Roscoe F. Vandaveer, Tulsa, Okla., assignor to Stanolind Oil and Gas Company, Tulsa, Okla., a corporation of Delaware No Drawing. Application June 19, 1948, Serial No. 34,147

5 Claims. (Cl. 260—449.6)

This invention is related to the preparation of a catalyst, and more particularly pertains to a catalyst suitable for use in the synthesis of hydrocarbons and oxygenated compounds from carbon monoxide and hydrogen, especially in the presence of iron and cobalt catalysts. Specifically, the invention relates to the preparation of a finely divided iron catalyst activated by added promoters and adapted for contacting gasiform fluids in a dense turbulent suspended phase. More specifically, the invention relates to the method of adding an alkali metal promoter compound to finely divided iron or iron oxide particles.

The use of iron or cobalt promoted with alkali metal as catalyst for the synthesis of hydrocarbons has long been known to the art. However, attempts to apply the fluidized solids technique to the synthesis of hydrocarbons using these catalysts in finely divided form have encountered unexpected problems in catalyst activity control. For example, the carry over of the more finely divided particles, e. g. particles below about 45 microns diameter, has resulted in an unpredictable change in the activity and selectivity of the remaining catalyst. It is, therefore, an object of this invention to provide a method and means for preparing catalysts of substantially uniform catalytic effect. Another object of the invention is to provide a method and means for promoting a finely divided iron catalyst adapted for the synthesis of hydrocarbons and oxygenated from carbon monoxide and hydrogen. It has been found that an optimum concentration of promoter exists for the synthesis of hydrocarbons in the desired molecular weight range, and it is a specific object of my invention to provide a method for promoting iron catalyst for synthesis of hydrocarbons from CO and $H_2$ which produces catalysts of selected and uniform activity and selectivity.

The presence of fines in the dense turbulent suspended phase is generally desirable for ease of fluidization. Therefore, it is usually desirable that the finely divided catalyst as charged to the reactor include a certain proportion of relatively large, intermediate, and relatively fine particles. Conventionally finely divided iron catalyst is activated by slurrying the catalyst with a water solution of $K_2CO_3$ and decanting the excess solution. By this method, the final $K_2O$ content of the catalyst is dependent upon the concentration of the initial solution and the extent of solution retention by the catalyst.

On objection of the first method of applying promoters to powdered iron catalyst is that the catalyst must be permitted to settle before the excess solution can be decanted and this seriously limits the amounts of catalyst which can be activated by a given apparatus. Furthermore, the retention value of the catalyst usually varies from a small batch to a large batch, and there is, therefore, no reproducibility of a uniform catalyst of known or desired activity. Even when the calculated amount of promoter is dissolved in just enough water to wet the catalyst, difficulty is encountered in obtaining complete wetting of the particles. It is, therefore, an object of this invention to provide a system wherein a catalyst promoter is distributed uniformly throughout a mass of finely divided particles.

In general, I have discovered that the above difficulties can be avoided and uniform distribution of the promoter on the catalyst particles obtained if I supply the promoter in the form of a solution of a surface active salt of the alkali promoter metal, e. g. potassium lauryl sulfate. In another embodiment of my invention, I may supply the alkali metal compound as the carbonate, nitrate, or other suitable salt of the alkali promoter metal in an aqueous solution to which has been added a surface active agent.

Substances suitable for reducing the surface tension of the impregnating solution which I prefer to use are, for example, the sulfonated alkyl benzenes and naphthalenes, such as sodium alkylnaphthalenesulfonate (Alkanol B); the sulfuric acid esters of higher alcohols, such as lauryl alcohol; and long chain aliphatic sulfonic acids. Another class of very useful materials for my purpose includes the potassium or sodium alkyl sulfosuccinic esters. A useful material in this class is Aerosol OT which comprises dioctyl sodium sulfosuccinate plus water and a mutual solvent. A particularly useful formulation includes an aqueous solution of a surface active agent comprising an alkali metal salt of an alkylaryl sulfonate, for example a polycyclic aromatic sulfonate such as sodium nonylnaphthalene sulfonate and a substantial proportion of a mutual solvent such as cyclohexanol, 2-butoxy 1-ethanol (butyl-cellosolve) or other hydrophilic solvent or mixture of such materials. It is also contemplated that such surface tension lowering agents as sulfonated fatty alkanolamine, and the fatty acid soaps, such as potassium oleate and potassium stearate, may be used.

I have found that the desirable results of my invention can be attained by employing a quantity of surface active material sufficient to reduce the surface tension of the treating solution below about 40 dynes per centimeter. The amounts of the agent required for my purposes, however, are very small, usually of the order of between about 0.1 and 1.0% depending upon the particular agent employed and the character of the catalyst surface being treated. The alkali metal salts or compounds may be employed, e. g. salts of potassium, sodium or lithium.

In the hydrocarbon synthesis process, with reference to which this invention is specifically described, an iron catalyst is employed at a temperature between about 400 and 750° F. and at pressures of between about 75 and 600 pounds per square inch. A preferred range of temperature is between 450 and 675° F. and a pressure of between about 250 and about 450 pounds per square inch, e. g. about 325 pounds per square inch. The space velocity through the reactor can be between about 5 and 15 cubic feet of carbon monoxide per hour per pound of catalyst within the reactor. A hydrogen to carbon monoxide ratio of between about 2 to 1 and 5 to 1 can be used with an optimum carbon monoxide content of between about 9 and about 15% in the actual feed to the reactor which may also include some nitrogen and light hydrocarbons. Ordinarily, the total feed to the synthesis reactor will also include some recycled carbon dioxide in varying proportions. Thus, the total feed may, for example, comprise a mixture of hydrogen, carbon monoxide and carbon dioxide in the ratio of about 2–6:1:2–.5, a ratio of about 3.5:1:1 being particularly useful.

The catalyst for use in such a process should be in a finely divided form capable of being fluidized by gas flowing upwardly through a bed at low velocities to produce a turbulent suspended catalyst phase. A satisfactory catalyst may have particles in the range of between about 2 and 300 microns, preferably 20 to 200 microns diameter. A satisfactory catalyst, for example, is one in which the maximum size is about 200 microns, a minimum of 50% is between 45 to 150 microns, for example about 75 microns, and a maximum of 25% is smaller than 45 microns. A typical catalyst for fluid technique operation may have, for example, about the following range of particle sizes:

Particle size (microns):

| | Percent |
|---|---|
| 0–45 | 20 |
| 45–75 | 25 |
| 75–150 | 45 |
| Over 150 | 10 |

In practicing my invention, it is preferred to use as a starting material a finely divided iron oxide which will yield a catalyst of the desired distribution of particle sizes.

With vertical gas velocities of the order of between about 0.3 and about 5.0 feet per second, preferably between about 0.5 and 2, for example, about 1 foot per second, a liquid-like dense phase of catalyst is obtained. In such a liquid-like dense turbulent phase, the bulk density of the catalyst is between about 20 and 80% of the density of the settled catalyst material, preferably between about 60 and 70%. Normally a catalyst prepared in accordance with my invention will have a settled bulk density of between about 120 and 150 pounds per cubic foot. The vertical or linear velocity of the gas is, in any event, regulated so as to produce a turbulent suspension of catalyst within the reaction zone having an apparent density of about 45 to 100 pounds per cubic foot.

The amount of potassium promoter for the iron catalyst for CO hydrogenation can be between about 0.1 and about 2.5%, for example between about 0.25 and about 1.5% promoter calculated as $K_2O$. The promoter may be added to the catalyst in the form of a modified aqueous solution of the carbonate, fluoride, or other salt of an alkali metal. For example, an aqueous solution of between about 2 and about 10% potassium carbonate and between about 0.2 and .75% of a wetting agent may be added to the iron catalyst before the reduction step. By this technique all batches are uniformly promoted, settling and decanting operations are eliminated, and waste of unrecoverable promoter solution is avoided.

If desired, the promoting alkali can be deposited by treating segregated sizes with a solution of the promoter compound. In the most usual case, however, promoter will be added in the form of a modified aqueous solution of the carbonate, fluoride or other salt and the mixed sizes will be treated simultaneously.

After applying the promoter, the iron oxide is dried and reduced with hydrogen at an elevated temperature and pressure to convert it at least in part to metallic iron. The temperature of the reduction may vary over a considerable range, for example 600 to 1000° F., a preferred temperature being between about 600° and 800° F., for example 700° F., and at superatmospheric pressure, for example 30 to 450 pounds per square inch.

Following the reduction, it is sometimes desirable to subject the catalyst to a high temperature stabilization treatment or "sintering" by contacting with a reducing gas such as hydrogen or a hydrogen-rich gas for a time at a temperature of between about 1100 and 1400° F. By this treatment, the catalyst is rendered resistant to disintegration in use.

To prepare a fluidizable catalyst from mill scale, it may be first ground to the desired particle size distribution, for example as follows:

20%—finer than 45 microns
70%—45 microns to 150 microns
10%—150 microns to 400+ microns.

After grinding, the plate-like oxide particles are impregnated with the aqueous solution of the promoter, to deposit the promoter in the proportion of between about 0.5 to 2% alkali metal calculated as the oxide and based on the total weight of iron.

In one example, a finely divided iron catalyst produced by grinding mill scale was treated with a 4% aqueous solution of potassium carbonate to which had been added 0.5% of an agent comprising about 50% water, 30% sodium nonyl-naphthalene sulfonate, about 15% cyclohexanol, and about 5% sodium sulfate to give a catalyst having thereon between about 0.5% and about 0.6% potassium calculated $K_2O$. A second batch of catalyst was similarly promoted but in the absence of the 0.5% of the impregnation accelerator. The two catalysts were then compared under synthesis conditions and it was found that catalyst prepared according to this invention produced 60% more liquid hydrocarbons than the control, i. e. 240 ml. were produced as compared to 150 ml. in the control.

Although a specific embodiment of my invention has been described, it should be understood that this is by way of illustration only, and modifications and alternatives which will become apparent to those skilled in the art are contemplated as coming within the scope of the invention. It is, for example, contemplated that the porous metal or metal oxide material impregnated in accordance with my invention may comprise massive porous bodies or granular solids adapted for fixed or moving bed operations, as well as finely divided particles. A characteristic of these materials is that they are resistant to uniform pore penetration by an aqueous solution, but that the exposed surfaces are normally water-wettable. Likewise, it is contemplated that the promoter may be a surface active salt of an organic acid formed in situ by the reaction between an ionizable potassium compound and an ionizable surface active substance. Although I do not intend to be limited by any theory of my improved process, it may be that the pores are blocked by gases and satisfactory pore penetration is, therefore, not obtained. In any event, I have discovered that the inclusion of a surface active material in the aqueous solution results in uniform pore penetration.

What I claim is:

1. In a process for the synthesis of hydrocarbons from hydrogen and carbon monoxide, the step which comprises passing a mixture of hydrogen and carbon monoxide over a catalyst prepared by adding between about 0.1 and about 2.5% of an alkali metal compound to a mass of finely divided iron catalyst as an aqueous solution of an alkali metal salt of a sulfonic acid having at least 8 carbon atoms, the quantity of solution being only sufficient to be absorbed by the mass of catalyst, drying the impregnated catalyst, and contacting the dried catalyst with a reducing gas at a temperature above about 700° F. under superatmospheric pressure.

2. In a process for the synthesis of hydrocarbons from hydrogen and carbon monoxide, the step which comprises passing a mixture of hydrogen and carbon monoxide over a catalyst prepared by impregnating a mass of finely divided iron catalyst with an aqueous solution of a water soluble compound of an alkali metal promoter in the presence of a surface active material added in amount sufficient to reduce the surface tension of the solution to less than about 40 dynes per centimeter, the concentration of the compound in the solution being sufficient to add to the catalyst between about 0.1 and about 2.5 percent of the alkali metal calculated as $K_2O$, absorbing all of the solution in the catalyst mass, drying the impregnated catalyst, and contacting the dried catalyst with a reducing gas at an elevated temperature and under superatmospheric pressure.

3. In a process for the synthesis of hydrocarbons from hydrogen and carbon monoxide, the step which comprises passing a mixture of hydrogen and carbon monoxide over a catalyst prepared by adding an alkali metal compound to a mass of finely divided iron catalyst as an aqueous solution of a water soluble compound of the alkali metal promoter in the presence of a surface active material in amount sufficient to reduce the surface tension of the solution to less then about 40 dynes per centimeter, drying the impregnated catalyst, and contacting the dried catalyst with a reducing gas at a temperature above about 700° F. under superatmospheric pressure.

4. The process of claim 3 wherein the surface active material includes a hydrophilic solvent.

5. The process of claim 3 wherein the surface active material comprises 0.5 percent of a solution consisting essentially of about 50 percent water, about 30 percent sodium nonyl napthalene sulfonate, about 15 percent cyclohexanol, and about 5 per cent sodium sulfate.

ROSCOE F. VANDAVEER.

REFERENCES CITED

The following references are of record in the file of this patent:

UNITED STATES PATENTS

| Number | Name | Date |
| --- | --- | --- |
| 1,914,727 | Pier et al. | June 20, 1933 |
| 2,254,806 | Michael | Sept. 2, 1941 |
| 2,426,829 | Kearby | Sept. 2, 1947 |
| 2,438,449 | Mosesman | Mar. 23, 1948 |
| 2,464,480 | Beck et al. | Mar. 15, 1949 |
| 2,467,282 | Warner | Apr. 12, 1949 |
| 2,471,129 | Vesterdal | May 24, 1949 |
| 2,479,420 | Segura | Aug. 16, 1949 |
| 2,485,945 | Walker | Oct. 25, 1949 |
| 2,490,260 | Ehrhardt | Dec. 6, 1949 |

FOREIGN PATENTS

| Number | Country | Date |
| --- | --- | --- |
| 280,522 | Great Britain | Mar. 28, 1929 |

OTHER REFERENCES

Lenher: "The Expanding Applications of Wetting Agents," Chemical Industries, March 4th issue, (1941), vol. 48, No. 3, pp. 324–26.